United States Patent [19]
Johansson et al.

[11] Patent Number: 5,676,113
[45] Date of Patent: Oct. 14, 1997

[54] METHOD FOR IGNITION TIMING CONTROL IN COMBUSTION ENGINES

[75] Inventors: Hans Johansson; Jan Nytomt, both of Amal, Sweden

[73] Assignee: Mecel AB, Sweden

[21] Appl. No.: 628,606

[22] PCT Filed: Aug. 8, 1995

[86] PCT No.: PCT/SE95/00912

§ 371 Date: Apr. 11, 1996

§ 102(e) Date: Apr. 11, 1996

[87] PCT Pub. No.: WO96/05427

PCT Pub. Date: Feb. 22, 1996

[30] Foreign Application Priority Data

Aug. 11, 1994 [SE] Sweden ................... 9402686

[51] Int. Cl.⁶ ........................................ F02P 5/15
[52] U.S. Cl. ........................................ 123/425
[58] Field of Search ...................... 123/415, 416, 123/417, 425, 435

[56] References Cited

U.S. PATENT DOCUMENTS

| | | | |
|---|---|---|---|
| 4,377,140 | 3/1983 | Latsch | 123/415 |
| 4,417,556 | 11/1983 | Latsch | 123/425 |
| 4,488,528 | 12/1984 | Morikawa | 123/425 |
| 4,535,738 | 8/1985 | Ma | 123/425 |
| 4,622,638 | 11/1986 | Anderson et al. | 123/425 |
| 4,762,106 | 8/1988 | Blauhut | 123/425 |
| 5,146,893 | 9/1992 | Ohsawa | 123/425 |
| 5,189,373 | 2/1993 | Murata et al. | 123/425 |
| 5,337,716 | 8/1994 | Fukui et al. | 123/425 |
| 5,425,339 | 6/1995 | Fukui | 123/425 |

*Primary Examiner*—Willis R. Wolfe
*Attorney, Agent, or Firm*—Ostrolenk, Faber, Gerb & Soffen, LLP

[57] ABSTRACT

An improved method applied in combustion engines which use the ionization current in the combustion chamber in order to extract a parameter representative of the pressure in the cylinder, which parameter is used for controlling the ignition timing within an extended range for the load- and speed range. The method is based on an integration of a parameter dependent on the ionization current. In a first embodiment, the mass center position of the integral is calculated, which mass center position is used as a position corresponding to the peak pressure position. The ignition timing is adjusted in such a manner that the mass center position, and hence the peak pressure position, strives to obtain a predetermined target value. In a second embodiment, an integrated value is calculated, which take into account the mechanics of the combustion engine, in such a way that the integrated value corresponds to a value representative of the torque transmitted to the crankshaft. By optimizing the integrated value, the torque transmitted to the crankshaft can be optimized as well, obtaining an optimal usage of the fuel-air mixture supplied.

12 Claims, 3 Drawing Sheets

METHOD FOR IGNITION TIMING CONTROL IN COMBUSTION ENGINES

BACKGROUND OF THE INVENTION

The present invention relates to a method for controlling ignition angle/timing in combustion engines.

Combustion engines are desirably designed in order to extract maximum obtainable work for each mount of fuel supplied. In piston engines the start of combustion should take place at a point of time such that the combustion pressure is optimised with respect to amplitude and crankshaft position, obtaining maximum positive torque from the combustion engine. From U.S. Pat. No. 4,417,556 is previously known a method wherein the pressure peak position from the combustion is detected, using an ionisation sensor in the combustion chamber. The peak position of the ionisation current coincides with the position of the peak position of the combustion pressure. By controlling the crankshaft position of the combustion engine and detecting when the first order of derivative of the ion current changes sign, the pressure peak position determined, and if the determined pressure peak position deviates from a predetermined target value then the ignition timing is corrected. In U.S. Pat. No. 4,535,738 is shown a further developed solution of the method described in U.S. Pat. No. 4,417,556, using furthermore a weak diagnostic discharge at the ordinary spark plug before generation of the ordinary ignition discharge, which weaker diagnostic discharge is used to predict the propagation speed of the flame front and dependent on the predicted propagation speed make a correction of the ignition timing.

With the solutions mentioned in U.S. Pat. No. 4,535,738 and U.S. Pat. No. 4,417,556 difficulties arise when applied in mass produced engines and during the operating conditions these engines are subjected to a number of fuel varieties. The ion current signal, during real operating conditions especially at low load and idling, a very unstable signal having several local minimum and maximum values, thus changing the sign of the first order derivative several times. Large variations between successive combustion's, even in the same cylinder at constant load-speed and amount of fuel applied, and rough combustion's, leads peak position of the ion current being displaced as much as 10 crankshaft degrees from the peak position of the combustion pressure.

SUMMARY OF THE INVENTION

An object of the invention is, for a combustion engine having a measure gap arranged in the combustion chamber detecting ionisation current in the combustion chamber, which measure gap preferably consist of the spark plug gap of the combustion engine, utilising the ionisation current in the combustion chamber as a parameter representative of the cylinder pressure, and obtaining a more reliable ignition timing control dependent of the detected ionisation current Another object is to obtain a method for ignition timing control adapted for mass produced Otto engines, which engines cause comparatively large variations between successive combustion's, where the sign of the first order derivative of the ion current could change several times during the so called post ionisation phase due to unstable combustion.

Yet another object is to enable a feed back control of the ignition timing adapted for each individual engine and the conditions of the individual engine, obtaining optimum ignition timing.

The foregoing and other objects of the invention are achieved with the present invention by a method for controlling the ignition angle/timing IgnP in a combustion engine which includes detecting the degree of ionisation in at least one combustion chamber of the combustion engine by means of a measuring gap arranged in the combustion chamber having a bias voltage applied, thereby developing an ionisation current in the measuring gap having an amplitude dependent on the degree of ionisation. A function dependent on at least an ionisation current representative parameter is integrated over a predetermined range of crankshaft degrees. The actual value obtained from the integration is then compared with a target value to determine a value $\Delta IgnP$, where $\Delta IgnP$ in the retarding or advancing direction is determined by the actual value falling short or exceeding, respectively, the target value. The ignition angle/timing is then corrected in predetermined increments $\Delta IgnP$ for following ignition events as $IgnP_{following} = IgnP_{preceding} + \Delta IgnP$. By using an integrated value of a parameter representative of the ion current, method is obtained for ignition timing control applicable for an increased number of operating cases. The value based on the internated value is considerably more insensitive for short fluctuations of the ion current signal, which fluctuations often occur at low speeds(revs) and low load when the combustion is rather unstable from one combustion to another combustion. Use of the ionisation current for controlling the ignition liming could hence be applied in vehicle engines, which engines are subjected to large variations in speed and load, with a larger deuce of reliability and larger regulating range within the operating range of the combustion engine.

In a first alternative method the calculated mass centre of the integral is used as base for control of the ignition timing. The mass centre of the integral corresponds to the pressure peak position of the combustion for an increased number of speed- and load ranges.

In a second alternative method, is an integration is used where also the mechanics of the combustion engine is a factor in the integration, in order to determine a representative integrated value of the torque transmitted to the crankshaft. Optimising this value results in a corresponding optimisation of the torque obtained.

Other features and advantages of the present invention will become apparent from the following description of the invention which refers to the accompanying drawings.

DETAILED DESCRIPTION OF THE PREFERRED EMBODIMENTS

Figure 1:
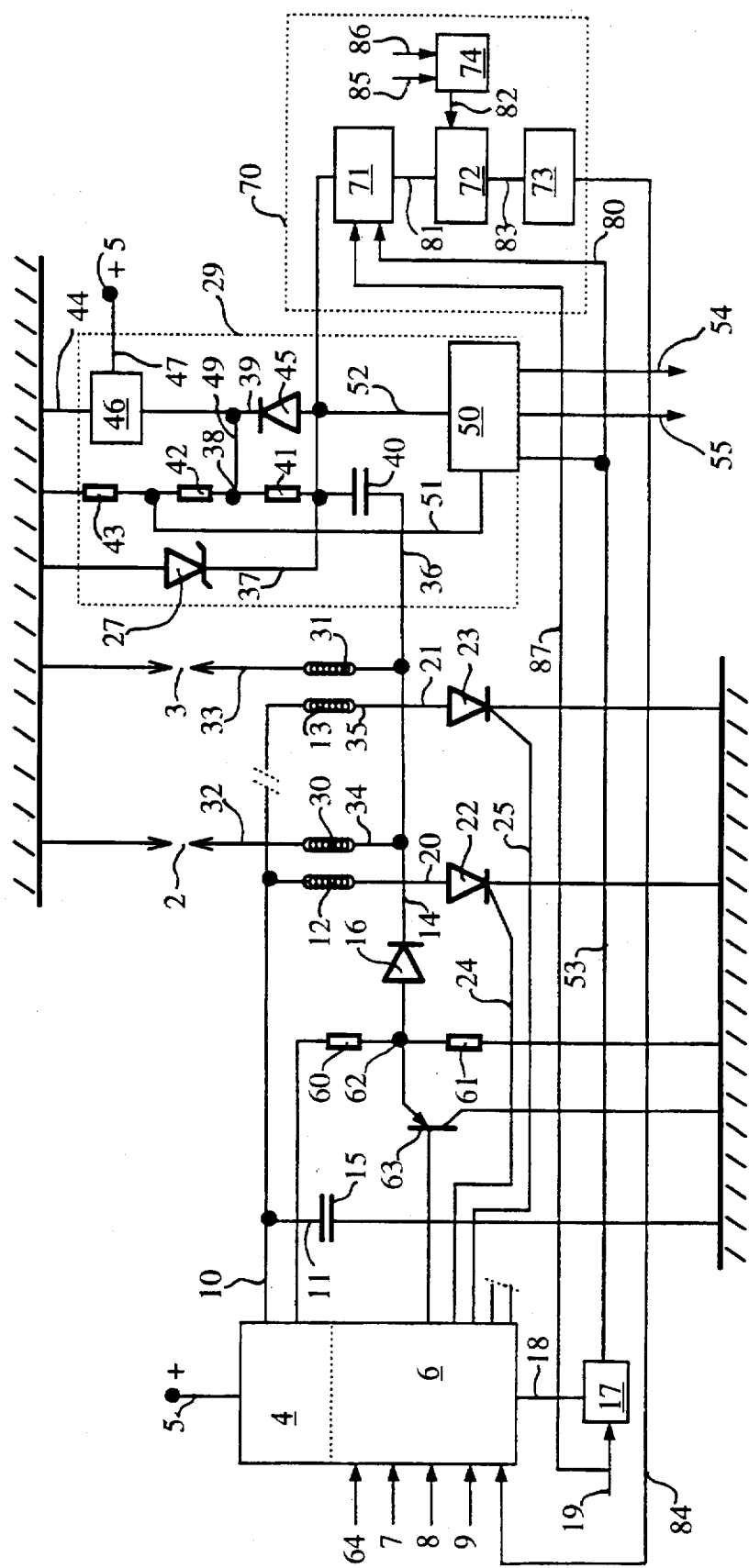
FIG. 1 shows schematically a capacitive type of ignition system having an inventive arrangement for carrying out the inventive method.

The ignition system principally illustrated in FIG. 1 is of the same capacitive type as shown in EP,B, 188180 and SE,C,457831, and is applicable to a multi-cylinder ,Otto-type engine, although only two of the spark plugs 2,3 intended for the cylinders of the engine cylinders have been shown. In the system there is included a charging circuit 4, obtaining voltage supply from a low voltage source 5, e.g. a 12 volt battery. After transforming up, the charging circuit 4 supplied a voltage of approximately 400 volts to a line 10, to which there is also connected a wire 11 to a charging capacitor 15, in turn connected to ground. This capacitor is thus charged to about 400 volts and is in communication via line 10 with primary windings 12,13, coupled in parallel, of a number of ignition coils corresponding to the number of engine cylinders. Each primary winding 12,13 is connected to a circuit 20,21 respectively, which circuit is in turn connected to ground across a thyristor 22,23, respectively. Via signals on lines 24,25 respectively, the thyristors 22,23 can close the ground connection 20,21 of the primary windings 12,13, respectively, the lines 24,25 coming from an ignition timing unit 6, hereinafter designated timing unit. The latter receives on lines 7,8,9,64 input signals relating to engine revolutions, load, crankshaft angular position and engine temperature, and generates, after processing said signals in a microcomputer-based system incorporated in the timing unit, output signals in response to said input signals. When the ground connection of the primary windings 12,13 closes as a consequence of a timing signal being sent to the thyristor 22,23 respectively, the capacitor is discharged to ground via the line 20,21 respectively. The appropriate primary, winding then induces a high ignition voltage (about 40 kVolt) in its corresponding secondary winding 30,31 respectively. The secondary winding is included in an ignition circuit 32,33 respectively, supplying voltage to the spark plug 2,3 respectively, for igniting the fuel-air mixture fed into the respective combustion chamber.

The negative end of the secondary winding 30,31, respectively, is in communication with the central electrode of the spark plug 2,3, respectively, this electrode thus obtaining a first negative ignition pulse for sparking over to the grounded electrode of the spark plug. The other, positive, end 34,35 respectively, of the secondary winding 30,31, respectively, is grounded via a line 36, which included a measuring device 29.

Associated with the latter there is, inter alia, a measuring capacitor 40 in series with three lines 37,38,39 connected in parallel, each of the latter completing the grounding connection and also co-acting, in a manner explained below, with a first detector unit 50 and a second detector unit 70 included in the measuring clerical 29.

In the charging circuit 4, a voltage is generated which is used for charging the capacitor. This voltage is used in a voltage divider having two resistors 60,61 connected in series between the charging circuit 4 and ground. The resistance of the resistors 60,61 is chosen in such a manner that a predetermined constant voltage in the interval 70–400 volts is obtained at a point of connection 62 between the resistors. The point of connection 62 is via a line 14 and a connected diode 16, connected to the line 36 for voltage supply of the measuring capacitor 40. The point of connection 62 is also connected to ground via a transistor 63, with the base gate of the transistor being connected to the timing unit 6.

Of the lines 37,38,39 leading to ground and connected to the capacitor 40, the line 37 includes a Schottky diode 27 with its cathode connected to the capacitor 40 and its anode to ground. The line 38 includes a diode 45 with its cathode connected to a voltage stabiliser 46 functioning as a low voltage source and connected to ground by line 44. Said voltage stabiliser is also via a line 47 connected to the low voltage source 5, which also serves the charging circuit 4.

A line 49 from the voltage stabiliser is connected between the resistors 41,42, and between the resistors 42,43 there is a voltage transfer via line 51 to the first detector unit 50. The line 51 transfers a reference voltage to the first detector unit 50, while a line 52 takes the voltage between the capacitor 40 and resistor 41 as an actual value to the first detector unit 50 and the second detector unit 70.

A comparison takes place between the reference value on the line 51 and the actual value on the line 52, the comparison takes place in a comparator included (not shown) in the first detector unit.

A signal on a line 53 from a measurement window unit 17 is also fed to the first detector unit 50. The measurement window unit obtains on a line 18 from the timing unit 6 an input signal relating to the time for triggering the ignition pulse, and on a line 19 an input signal relating to the prevailing crankshaft angular position. The output signal of the unit 17 on line 53 represents those ranges of the crankshaft angle, the so-called measurement windows, over which the first detector unit 50 shall operate for deciding whether ionising current flows in the ignition circuits 32,33 or not.

The first detector unit 50 thus sends on lines 54,55 output signals representing either "detected" or "undetected" ionising current during different measurement windows, thus indicating on line 54 for example preignition, and on line 55 combustion knock, which combustion knock occurs during the later phase of the ionising current, i.e. the so-called post-ionisation phase.

The second detector unit 70 coupled in parallel with the first detector unit 50 to the line 52, at which line 52 the current actual value representative of a ion current parameter is present, in this case a reduced voltage potential, where the voltage reduction is proportional to the increase of the ion current. In the second detector unit 70 the ion current signal is processed enabling correction of the ignition timing in order to maintain optimum performance. An integrator is used in the first part 71 of the second detector unit, which integrator perform an integration of the actual value when a signal at line 80 from the measurement window unit 17 indicates that the second detector unit should start the integration, i.e. that the proper crankshaft range is present. The mass centre of the integral is thereafter calculated, which in a first embodiment could correspond to the crankshaft angle where parts of the integrated value on both sides of the mass centre have equivalent values. In order to determine the relative position of each incrementally integrated value of the ion current in relation to the current crankshaft angle, the circuit 70 receives an input signal at line 87.

After having determined the mass centre in the circuit 70 a signal corresponding to the current position of the mass centre is emitted at line 81 to a comparator 72. A comparison is made in the comparator of the current position of the mass centre and a target value, which target value is obtained at line 82 from a circuit 74 containing a memory with a map having prestored optimal target values for the crankshaft position of the mass centre dependent on different engine parameters, which preferably are empirically determined target values for the present type of engine. The target value changes dependent on at least the present engine speed and engine load, which parameters are detected by the circuit 74 at input terminals 85,86. Also other engine parameters such as engine temperature, current throttle position, cold start conditions (non operating catalytic reactor) and kick-down position of the accelerator pedal could affect the target value. The comparator transmit a signal at line 83, which signal is proportional to the detected difference between the current position of the mass centre and the target value for the type of engine used, which target value is obtained from the circuit 74.

The amount of correction of the ignition timing which should be initiated dependent on the signal at line 83 is thereafter determined in circuit 73. The circuit could include "intelligent" means for correction, where for example a mean value determination of the difference between the current value and the target value is established over a predetermined number of cycles, whereby a gradual and smoother regulation is obtained.

The circuit 73 give a ignition correcting signal to the timing unit 6 at line 84, dependent on existing difference between the current value and the target value. The ignition map could either be updated by the ignition correcting signal, which is preferable if the system should adapt to gradual changes in the engine and its auxiliary system, or alternatively that the ignition correcting signal is temporarily stored until engine shut-down and a new start of the engine should be initiated, possibly at new conditions such as change of fuel or new/adjused spark plugs, as an adaptable ignition correcting value subjected to change which affects the timing of following ignitions as read from the basic ignition map.

Figure 2:
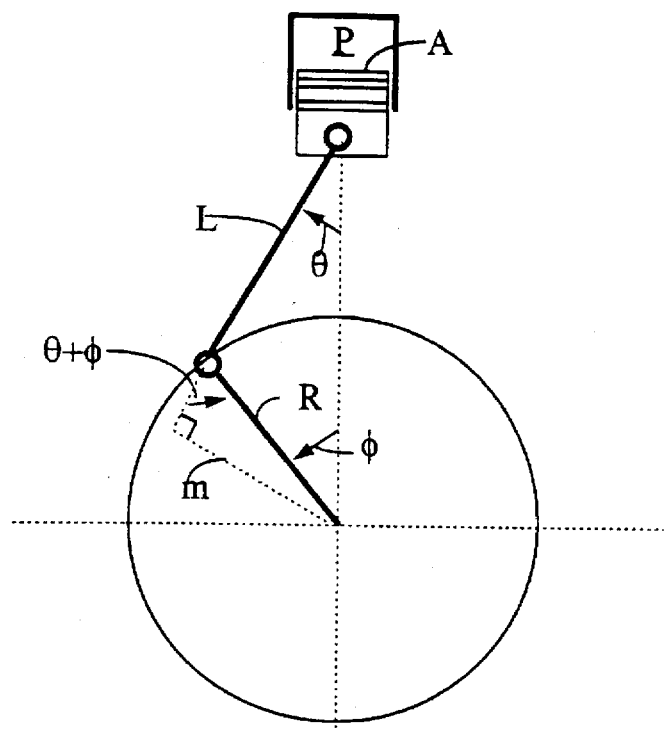
FIG. 2 shows the geometry of the combustion engine, which geometry is of use in an alternative embodiment in order to optimise the torque transmitted to the crankshaft dependent of the mechanics.

In FIG. 2 is shown the geometry of the combustion engine, which geometry is of use in an alternative embodiment in order to optimise the torque transmitted to the crankshaft dependent on the mechanics. This alternative embodiment does not use a function of the mass centre target value, which target value is stored in an empirically determined map in the circuit 74 shown in FIG. 1.

In FIG. 2 is illustrated schematically a combustion engine having a piston arranged in the combustion chamber with attached piston rod (L), crankshaft angle (θ) and crank length (R). The pressure P prevailing in the combustion chamber has an effect upon the upper top surface A of the piston, which leads to;

The force acting upon the piston, $F_k = P \cdot A$,

The force along the piston rod; $F_s = F_k / \cos(\theta)$,

Lever arm; $m = R \cdot \sin(\theta + \phi)$,

The torque transmitted to the crankshaft from the combustion;

$$M = F_s \cdot m = P \cdot R \cdot A \cdot \cos(\theta) \cdot \sin(\theta + \phi),$$

and by using trigonometric relations;

$$\sin(\theta) = \frac{R}{L} \cdot \sin(\phi)$$

$$\cos(\theta) = \sqrt{1 - \left(\frac{R}{L} \cdot \sin(\phi)\right)^2}$$

$$\sin(\theta + \phi) = \sin(\theta) \cdot \cos(\phi) + \cos(\theta) \cdot \sin(\phi) =$$

$$\frac{R}{L} \cdot \sin(\phi) \cdot \cos(\phi) + \sin(\phi) \cdot \sqrt{1 - \left(\frac{R}{L} \cdot \sin(\phi)\right)^2}$$

This gives that the torque M is only dependent on the crankshaft angle $\phi$, i.e.;

$$M(\phi) = P \cdot R \cdot A \cdot \left(\frac{R}{L} \cdot (\sin(\phi) \cdot \cos(\phi) + \sin(\phi) \cdot \sqrt{1 - \left(\frac{R}{L} \cdot \sin(\phi)\right)^2}\right) / \sqrt{1 - \left(\frac{R}{L} \cdot \sin(\phi)\right)^2}$$

Figure 4:
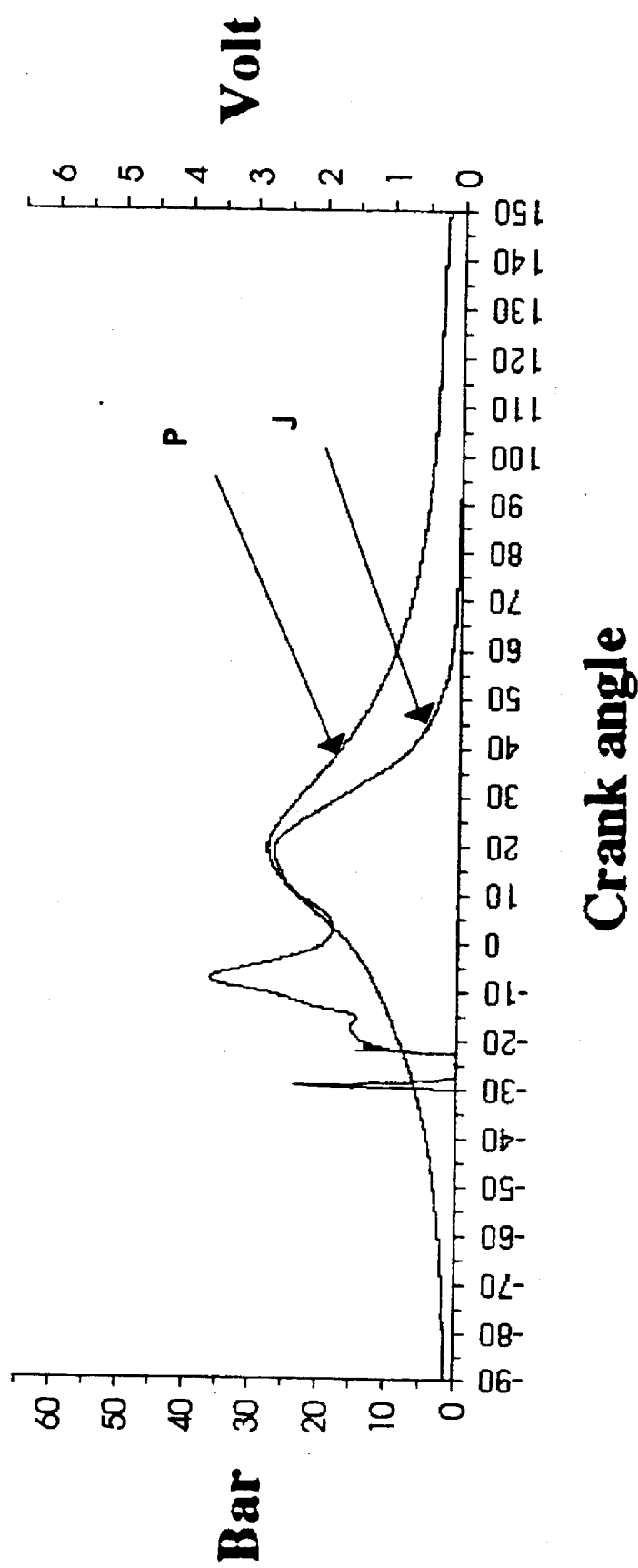
FIG. 4 shows an idealised representation of the relationship between the ion current and the cylinder pressure.

The ionisation current is measured as mentioned previously by application of a constant bias voltage between 70–400 volts over a measuring gap arranged in the combustion chamber, preferably the spark plug gap. Dependent on among others the variation of the temperature and the pressure during the combustion process in the combustion chamber, a varying conductivity is obtained conducting a current across the measuring gap. This current is called the ionisation current. From FIG. 4 one could see that from 0 degrees (crankangle degrees), i.e. when the piston is occupying the top dead centre position, and onwards there is a very good correspondence with the pressure curve P. This is an idealised combustion in the part-load range, where a stable ionisation current J is obtained having a rather distinctly defined maximum of the ionisation current after the upper dead position at 0 crankshaft degrees. The ionisation current, here represented as a reduction of the voltage in the same manner previously described in connection with FIG. 1, has a distortion at −30 degrees of crankshaft position due to activation of a transistor.

At −23 degrees of crankshaft position the spark is triggered and a flame is developed in the spark plug gap causing a very high deuce of ionisation shortly thereafter at −10 degrees of crankshaft position. The ionisation current has, up to 0 degrees of crankshaft position, the pressure superposed upon the flame-ionisation, i.e. the actual spark, and the flame in the spark plug gap ionises the fuel-air mixture and increases the conductivity in the measuring gap and hence also increases the ionisation current.

These often non-desirable "disturbances" of the ionisation current could however be removed by using numerical methods or using an approximation of the ionisation current up and until the upper dead position. One alternative could use available data in order to calculate the pressure before the ignition timing position. This pressure is depending on the design of the engine, i.e. the compression ratio and the crankshaft angle $\phi$. When the flame ionisation fades out and the pressure takes precedence in the ionisation current, which happen during the later phase of the ionisation current development, i.e. the post-ionisation phase, then the characteristics of the ionisation current have a good correspondence with the present pressure P within the cylinder, which occurs after the upper dead position at 0 degrees of crankshaft position. The starting point from where the ionisation current start to correspond to the pressure could be obtained by observing when the first order derivative of the ionisation current change its sign. Before the starting point, in order to obtain correspondence between ionisation current and pressure, is a corrected ionisation current calculated numerically, dependent on the design of the engine, i.e. compression ratio and crankshaft angle $\phi$, and approximation to the amplitude of the ionisation current at the starting point.

Alternatively could the ionisation current curve be approximated up and until the upper dead position, by interpolating backwards in time the ion current signal from a point shortly after the upper dead position to the ignition timing point, where the ionisation current could be considered having a zero value.

For further calculation either the numerically calculated or the approximated ionisation current is used in the range of crankshaft positions between the ignition timing point and the upper dead position.

After the upper dead position the actually detected ionisation current signal is used. The contribution from the numerically calculated or the approximated ionisation current before the upper dead position, is of less importance due to this contribution, after filtering out the disturbances, having an essentially lower level of amplitude compared with the amplitude of the ionisation current after the upper dead position, whereby the numerically calculated or the approximated ionisation current before the upper dead position give an acceptable approximation.

The torque M transmitted to the crankshaft is as previously expressed;

$$M(\phi) = P \cdot R \cdot A \cdot \left( \frac{R}{L} \cdot (\sin(\phi) \cdot \cos(\phi) + \sin(\phi) \cdot \sqrt{1 - \left(\frac{R}{L} \cdot \sin(\phi)\right)^2} \right) / \sqrt{1 - \left(\frac{R}{L} \cdot \sin(\phi)\right)^2}$$

But $J(\phi)$ could approximately correspond to $P(\phi)$, i.e. the ionisation current as a function of crank shaft degrees could substitute the pressure as a function of crank shaft degrees, whereby the torque M could be made dependent on the ionisation current J instead of the pressure P, whereby;

$$M_j(\phi) = J(\phi) \cdot R \cdot A \cdot \left( \frac{R}{L} \cdot (\sin(\phi) \cdot \cos(\phi) + \sin(\phi) \cdot \sqrt{1 - \left(\frac{R}{L} \cdot \sin(\phi)\right)^2} \right) / \sqrt{1 - \left(\frac{R}{L} \cdot \sin(\phi)\right)^2}$$

or that the torque could be integrated between two positions of crankshaft angle $\phi_1-\phi_2$, i.e. the present measuring window, expressed as;

$$M = \int_{\phi_1}^{\phi_2} M_j \cdot d\phi$$

The present measuring window $\phi_1-\phi_2$ could in reality correspond to a range of crankshaft positions from $0°-\phi_2$, where $\phi_2$ is a crankshaft position between 30°–90° degrees of crankshaft position after the upper dead position, with a previously described numerical calculation or approximation of the ionisation current in the range of crankshaft positions between $\phi_1-0°$, where $\phi_1$ is a crankshaft position between 90–40 degrees before the upper dead position.

Control of the ignition timing should be performed in such a way that the value of this integral is maximised;

$$Max \left[ \int_{\phi_1}^{\phi_2} M_j \cdot d\phi \right]$$

leading to the optimal amount on torque could being obtained from the engine. Some restrictive conditions could naturally be implemented in order to reduce the load on the engine, which increase the length of life, and reduce combustion noise. These restrictive conditions could set limits for the ignition advance. I.e. the maximum and minimum allowable ignition advance, which restrictive conditions could be dependent on engine parameters, for example dependent on engine speed, load and temperature.

Figure 3:
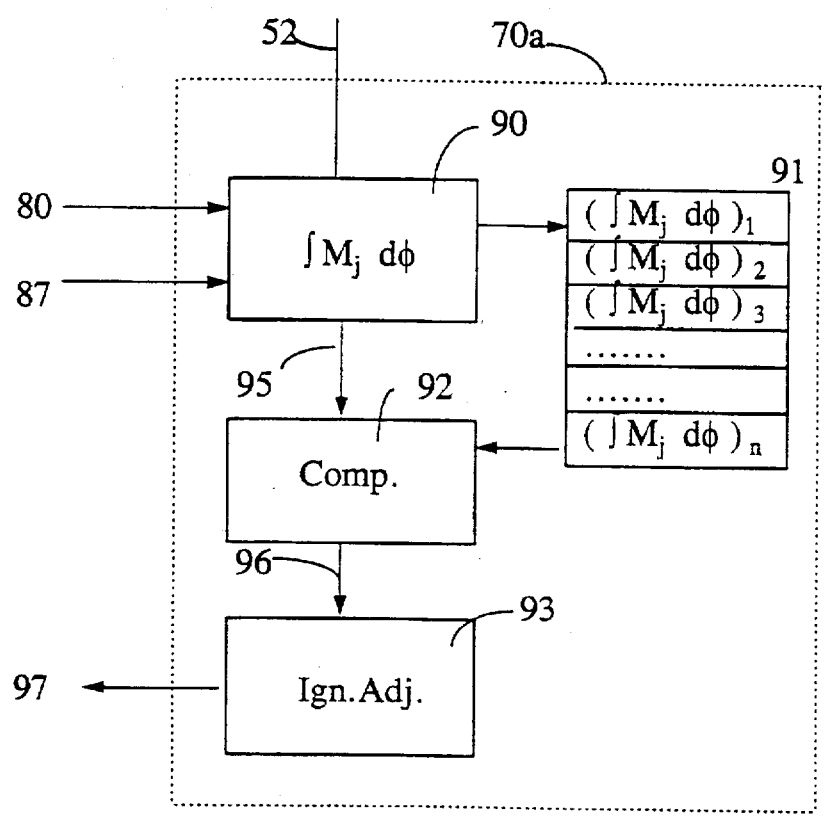
FIG. 3 shows an alternative embodiment of the second optimising control circuit.

In FIG. 3 is shown an alternative solution of the second detection unit 70, here denoted as 70a, which principally shows how a solution for maximising $$Max \left[ \int_{\phi_1}^{\phi_2} M_j \cdot d\phi \right]$$

could be implemented. The circuit 90 is in the same manner as shown in FIG. 1 connected to the line 52 where the present actual value of the ionisation current is represented, here in form of a reduced bias voltage, where the reduction is proportional to the increase of the ionisation current. In this alternative detector unit 70a is the ionisation current affecting the correction of the ignition timing in increments ΔIgnP of equal order and in the same direction of steps as long as the integral $$\int_{\phi_1}^{\phi_2} M_j \cdot d\phi$$

have an increasing tendency, i.e. that the actual value of the integral is higher than the values from preceding ignition events. In the first part 90 of the alternative detector unit 70a is the integral $$\int_{\phi_1}^{\phi_2} M_j \cdot d\phi$$

calculated, when a signal appearing at line 80 from the measuring window unit 17 indicates that the detector unit 70a should start integration, i.e. that the interesting crankshaft range present. The circuit 90 also obtains information regarding the present crankshaft position at line 87, for the execution of this calculation.

After having calculated the actual value then the value is stored in a memory 91, where a dedicated memory address contains the most recent integrated value and other memory addresses contains values from a number n of preceding ignition events, which could be equivalent to 5–30 of the recent preceding ignition events. When the most recent value should be stored, each value of the memory addresses is shifted on step of time order, whereby the oldest value disappear.

When the integrator 90 has calculated a new value and subsequently stored this value in the memory 91, a signal is generated at line 95 to the comparator 92, which comparator then compares the most recent calculated value with the values stored in the memory 91 from preceding ignition events. The values from preceding ignition events could in an alternative embodiment, instead of being stored in individual memory addresses, form a mean value being stored in one individual memory address. If the integrated value has an increasing tendency, then a signal is emitted to the ignition timing adjuster 93 indicating that the ignition timing correction ΔIgnP performed should be maintained in order of direction (increasing or decreasing ignition advance) and possibly also in order of step size. If the integrated value instead has an decreasing tendency, then a signal is emitted to the ignition timing adjuster 93 indicating that the ignition timing correction ΔIgnP performed should be changed in order of direction, i.e. if the ignition timing correction performed previously was performed in the advance direction, meaning increasing ignition advance, then the ignition timing correction is changed instead to decreasing ignition advance The ignition timing correction ΔIgnP performed is preferably initiated in incremental steps in the order of some tens of crankshaft degrees or parts thereof. Optimising the ignition timing to a crankshaft position with maximum obtainable torque, is then performed relatively slowly and will not be affected to any major extent if some occasional non-uniform combustion's occur. If for example the ignition timing correction is initiated in steps of 0.01 degrees of crankshaft angle, then more than a hundred combustion's is needed for obtaining a total correction of the ignition timing of 1 degree of crankshaft angle, on condition that the integral is continuously increasing during these combustion's and as a consequence of the ignition timing correction initiated. When a four-cylinder four stroke engine is operating at 6000 rpm, then two seconds will pass before a total ignition timing correction of one degree of crankshaft angle have been made, when using the correction step $\Delta IgnP=0.01°$ at each combustion and if the ignition timing correction is performed for each cylinder. In this way a hunting regulation is avoided, initiated in larger steps if occasional disturbances should occur in some of the combustion's. A relatively fast adaptation to optimal ignition timing is obtained, if the engine is subject to wear or other external influences, which might have changed the combustion conditions in the cylinder, or if refueling have been made of other type of fuels than the type of fuel which the basic ignition timing map have been optimised for.

A capacitive type of ignition system is used in the embodiment shown, demonstrating how the ionisation current could be detected. The inventive method is however not limited to application in capacitive type of ignition systems, and could nevertheless be applied in inductive type of ignition systems, where the entire step-up voltage is obtained in one step from 12 volt up to 30–40.000 volt, with switches of the IGBT-type(Insulated Gate Bipolar Transistor) managing the current regulation, which switches could withstand the high currents developed in inductive type of ignition system having the corresponding fast rise time of the ignition voltage.

Fast rise time of the ignition voltage is one prerequisite for a non-configurable spark, i.e. a spark having a constant spark energy, not interfering with the ionisation current after the upper dead position also at high speeds too. Alternatively could a configurable spark be used, which spark during lower revs will be given longer burn duration, possibly by repeated triggering of sparks.

The circuits shown in FIGS. 1 and 3 have for the sake of clarity been represented as separated modules, but could also be implemented as analogue or digital circuits specially designed for the respective function needed. The integration circuit could for example be made of discrete components where the integration is realised in a condenser-based circuit, where the successively stored energy corresponds to the accumulated value from the integration. In a real implementation all functions are integrated into a microcomputer-based unit, where the integration and storage of values is made continuously by the computer, possibly controlled by interrupt-routines initiated at the moment of activation of the measuring windows.

The methods described above make use of the detected actual crankshaft angle as a base for integration and correction. In an equivalent method for regulation the time could instead be used as a base, where for example the ignition timing or other synchronising pulses from the crankshaft sensor could be used as references for initiating the start of integration or correction. At each speed detected will the time constitute a value representative for a crankshaft angle, in the same manner as will be given from an actually detected crankshaft angle.

We claim:
1. Method for controlling ignition angle/timing IgnP in a combustion engine in which at least one ignition event has previously taken place, comprising:
a) detecting the degree of ionisation in at least one combustion chamber of the combustion engine by means of a measuring gap arranged in the combustion chamber having a bias voltage applied, thereby developing an ionisation current in the measuring gap having an amplitude dependent on the degree of ionisation;
b) integrating over a predetermined range of crankshaft degrees a function dependent on at least an ionisation current representative parameter;
c) comparing the actual value obtained from integration with a target value to determine a value $\Delta IgnP$, where $\Delta IgnP$ in a retarding or advancing direction is determined by the actual value falling short of or exceeding, respectively, the target value;
d) correcting the ignition angle/timing in predetermined increments $\Delta IgnP$ for following ignition events as $IgnP_{following}=IgnP_{preceding}+\Delta IgnP$.

2. Method according to claim 1, wherein in step (b) the actual value based upon the integration constitutes the mass centre of the integral, which mass centre is given a value representative of a crankshaft angle position and, in step (c), the mass centre is compared with a target value for said crankshaft angle position.

3. Method according to claim 2, wherein the target value for said crank angle position is an empirically determined function for the type of engine used, which target value is dependent on at least the speed and load of the combustion engine.

4. Method according to claim 3, wherein the target value is permanently stored in a map in a memory containing target values for a number of different speed and load cases.

5. Method according to claim 1, wherein in step (b), the actual value based upon the integration constitutes a function dependent on the crankangle $\phi$, having parameters, $J(\phi)$ representative of the ionisation current $J$ and the torque $M(\phi,R,L)$ transmitted to a crankshaft, where R and L are constants given by the engine design corresponding to the crank radius and the length of the piston rod, respectively, associated with said combustion chamber.

6. Method according to claim 5, wherein in step (b) a product of the parameter representative of the amplitude of the ionisation current multiplied with the torque $M(\phi,R,L)$ is integrated, and step (d) includes maximizing such integrated value.

7. Method according to claim 6, wherein in step (c), the integrated actual value of the product of the parameter $J(\phi)$ representative of the amplitude of the ionisation current and the torque $M(\phi,R,L)$ is compared with a corresponding integrated value obtained from a preceding ignition event in the combustion chamber, and in step (d) the correction of the ignition angle/timing is performed according to a predetermined and continuously operating function in such a way that the correction is effected for following ignition events with a predetermined increment $\Delta IgnP$ and in the same direction of correction, either in the retarding or advancing direction, as long as the integrated value of the product of the parameter $J(\phi)$ representative of the amplitude of the ionisation current and the torque leverage $M(\phi,R,L)$ effecting the crankshaft from the combustion pressure have an increasing tendency in relation to the corresponding stored integrated value from preceding ignition events in the combustion chamber, but when having decreasing tendency shifts the corrective direction of the ignition angle/timing by the increment $\Delta IgnP$ from retarding to advancing or vice versa.

8. Method according to claim 7, wherein the integrated values from preceding ignition events in the combustion chambers constitute mean values of integrated values from at least five, immediately preceding ignition events in the combustion chamber.

9. Method according to claim 1, wherein the combustion engine has at least two combustion chambers and steps (a)–(d) are performed for each of the combustion chambers.

10. Method according to claim 1, wherein in step (b), the integration is made when a range of crankshaft angle $\phi_1$–$\phi_2$, where $\phi_1$ is in the interval 90–40 degrees before the upper dead centre position of the piston in the final phase of the compression stroke, and $\phi_2$ is in the interval 30–90 degrees after the upper dead position of the piston in the final phase of the compression stroke.

11. Method according to claim 10, wherein the range of crankshaft angle from $\phi_1$ and up until the upper dead position is the parameter representative of the ionisation current and is established from a numerical calculation, or an approximation of the parameter representative of the ionisation current, said approximation being made by interpolation from a parameter representative for the ionisation current at a point on time shortly after the upper dead position at the start of a post-ionisation phase and backwards in time towards a moment immediately preceding the ignition, at which moment of ignition the parameter representative of the ionisation current corresponds to a non-developed ionisation current.

12. Method according to claim 1, wherein the incremental correction $\Delta$IgnP in the retarding or advancing direction is restricted such that the IgnP$_{following}$ does not exceed predetermined restraining conditions.

* * * * *